L. BETHKE.
SPROCKET CHAIN.
APPLICATION FILED SEPT. 16, 1918
1,426,248.
Patented Aug. 15, 1922.
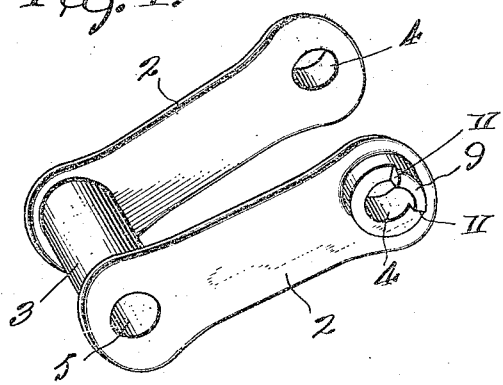
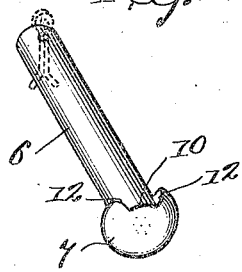
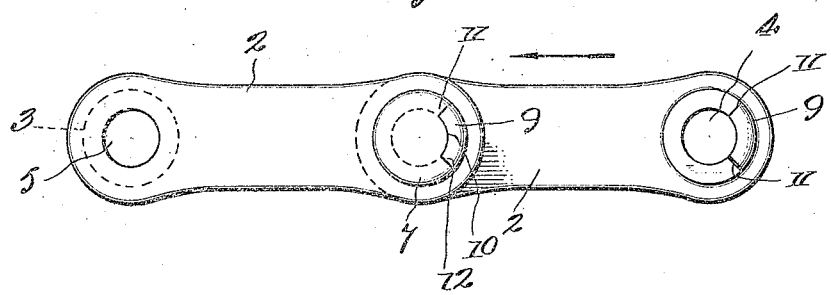
Inventor
Leo Bethke
by John S. Barker
Attorney.

UNITED STATES PATENT OFFICE.

LEO BETHKE, OF MILWAUKEE, WISCONSIN, ASSIGNOR TO CHAIN BELT COMPANY, OF MILWAUKEE, WISCONSIN, A CORPORATION OF WISCONSIN.

SPROCKET CHAIN.

1,426,248.  Specification of Letters Patent.  Patented Aug. 15, 1922.

Application filed September 16, 1918. Serial No. 254,305.

*To all whom it may concern:*

Be it known that I, LEO BETHKE, a citizen of the United States, residing at Milwaukee, in the county of Milwaukee and State of Wisconsin, have invented certain new and useful Improvements in Sprocket Chains, of which the following is a specification.

In the use of sprocket chains, especially those of the type in which the links are of U-shape united by pintles, it is quite customary to lock the pintles against rotation, in order to insure that wear due to articulation of the links shall be between the relatively long end bars of the links and the long portions of the pintles that lie therein rather than between the shorter portions of the pintles and the side bars in which such portions lie.

My invention has for its object to provide for locking against rotation the pintle of a sprocket chain in such way that the use of the chain under working conditions tends to positively hold the parts securely in locking engagement, preventing looseness and excessive wear of parts. In the accompanying drawings:

Fig. 1 is a perspective view of a single chain link embodying the preferred form of my invention.

Fig. 2 is a perspective view of a pintle adapted to be used in connection with the link shown in Fig. 1.

Fig. 3 is a side view of a section of a chain made up of links and pintles such as shown in Figs. 1 and 2.

In the accompanying drawings I have represented a section of chain made up of U-shaped links, one of which is shown detached in Fig. 1, and consisting of a pair of side bars 2 connected by a hollow tubular end bar 3. Chains made up of links of this kind are common in the art and the links are usually united by pintles 6, that pass through the apertures 4 in the free ends of the side bars and the apertures 5 in the tubular connecting end bars. The pintles are provided with heads 7 and usually have their ends which are opposite the heads upset, though other means may be used for holding them in place. A portion of the head of each pintle is cut away as indicated at 10 forming an opening, to engage with a projection 9, carried by a side bar 2, and located between the aperture 4 therein and its free end. The shape of the recess 10 and the projection 9 that fits therein is preferably a sector, with ends, designated 12 for the recess, and 11 for the projection, radial to the axis of the pintle and of the aperture 4 in which it lies. When a chain such described is under tension, the pintle 6 will have its recessed head 7 drawn into positive and forcible engagement with the projection 9 carried by one of the side bars of one of the links that the pintle unites, and as the contacting faces 11 and 12 are inclined as described, the projection acts as a wedge, so that the greater the force applied to the chain the more tightly these parts come together, and hence the more securely is the pintle held against rotative motion in the narrow (as compared with the long opening through the tubular end bars 3) openings 4 formed therefor in the side bars of the link. As the articulating parts of the chain wear through use, any looseness tends only to permit these locking elements to come more closely and forcibly together, so that under no circumstances do the locking parts that hold the pintles against rotation in their seats in the side bars ever become loose through wear.

It will be seen that the inner surface of the projection 9 is a prolongation of the wall of the opening 4 and that its ends 11, as has been stated, are radial to the axis of the said opening, the projection thus being in effect a segment of a hub surrounding the opening 4. This construction besides having the advantages that has already been pointed out facilitates the manufacture of the chain, since it permits the use of straight cylindrical cores in the molding of the link, the core serving to form not only the openings through the side bars of the link but also giving shape to the inner wall or face of the projection 9.

While I have only illustrated my invention as applied to a chain made up of cast links, each of unitary construction, I do not wish to be understood as thereby limiting my invention to use in connection with a chain formed of links of this character, as it might be used in connection with other forms of pintle-connected sprocket or drive chains, such for instance as those having side and end bars separate from one another.

What I claim is:

1. In a pintle-connected chain, the herein described link having side bars united by an integral tubular end bar, the free ends of the side bars distant from the end bar being perforated for the passage of a connecting pintle, and one of the side bars carrying an outwardly extending projection located on the side of the pintle-opening toward the free end of the side bars, the inner wall or face of the projection being a prolongation of the wall of the pintle-opening through the side bar.

2. A chain link such as described in claim 1 wherein the projection therein mentioned is the segment of a hub surrounding the pintle opening, the ends of which segment are radial to the axis of such opening.

3. A link such as described in claim 1, wherein the projection therein mentioned is the segment of a hub surrounding the pintle opening, the ends of which segment are radial with the axis of such opening, in combination with a pintle having a head recessed to fit the projection carried by the side bar of the link, when the pintle is seated and in working position.

4. In a pintle-connected chain, the herein described link having side bars united by an integral tubular end bar, the free ends of the side bars distant from the end bar being perforated for the passage of a connecting pintle, an opening in the said pintle forming a close fitting seat for an outwardly extending projection located on the side of the pintle opening toward the free end of one of the side bars, the inner wall or face of which projection is a prolongation of the wall of the pintle-opening through the side bar.

LEO BETHKE.